US012582149B1

(12) United States Patent　　　(10) Patent No.:　US 12,582,149 B1

Miljkovic　　　　　　　　　　　　　(45) Date of Patent:　　Mar. 24, 2026

(54) FUNCTIONAL ADDITIVE FOR HOT BEVERAGES AND FOODS

(71) Applicant: Igor Miljkovic, Palm Desert, CA (US)

(72) Inventor: Igor Miljkovic, Palm Desert, CA (US)

( * ) Notice:　Subject to any disclaimer, the term of this patent is extended or adjusted under 35 U.S.C. 154(b) by 20 days.

(21) Appl. No.: 19/289,077

(22) Filed:　Aug. 3, 2025

(51) Int. Cl.
　　 *A23L 33/16*　　　(2016.01)
(52) U.S. Cl.
　　 CPC ................................... *A23L 33/16* (2016.08)
(58) Field of Classification Search
　　 CPC ....................................................... A23L 33/16
　　 USPC .......................................................... 426/74
　　 See application file for complete search history.

(56)　　　　　　References Cited

U.S. PATENT DOCUMENTS

| | | | |
|---|---|---|---|
| 5,612,061 | A | 3/1997 | Rabkin |
| 8,852,660 | B2 | 10/2014 | Miljkovic |
| 9,144,581 | B2 | 9/2015 | Miljkovic |
| 9,539,282 | B2 | 1/2017 | Lucas |
| 11,266,169 | B2 | 3/2022 | Tarnava |
| 2016/0113865 | A1 | 4/2016 | Kazakevitch |

FOREIGN PATENT DOCUMENTS

| | | | | |
|---|---|---|---|---|
| JP | 2015205791 | A | 11/2015 | |
| WO | WO-2025064685 | A1 * | 3/2025 | ........... A61K 9/0056 |

OTHER PUBLICATIONS

Ohta, Shigeo, Chapter Fifteen—Molecular Hydrogen as a Novel Antioxidant: Overview of the Advantages of Hydrogen for Medical Applications, Methods in Enzymology, vol. S55, pp. 289-317, 2015.

Ichihara, M. et al, Beneficial biological effects and the underlying mechanisms of molecular hydrogen—comprehensive review of 321 original articles, Medical Gas Research, vol. 5, Article 12, 2015.

Ohta, Shigeo, Molecular hydrogen as a preventive and therapeutic medical gas: initiation, development and potential of hydrogen medicine, Pharmacology & Therapeutics, vol. 144, Issue I, pp. 1-11, 2015.

Ge, Li et al, Molecular hydrogen: a preventive and therapeutic medical gas for various diseases, Oncotarget, 2017; 8: 102653-102673.

Ohno, K. et al, Molecular Hydrogen as an Emerging Therapeutic Medical Gas for Neurodegenerative and Other Diseases, Oxidative Medicine and Cellular Longevity, vol. 2012, Article ID 353152.

Lebaron, T.W. et al, ORP should not be used to estimate or compare concentrations of aqueous H2: An in silico analysis and narrative synopsis, Frontiers in Food Science and Technology, 2:1007001, 2022.

* cited by examiner

*Primary Examiner* — Brent T O'Hern

(57)　　　　　　ABSTRACT

The present disclosure provides functional compositions for producing hydrogen in hot foods and beverages. In certain embodiments a composition for a functional powder additive containing unstabilized elemental zinc and a chelated mineral salt is described. Certain embodiments include a quantity of unstabilized elemental zinc having a particle size of 37 μm and a molar excess of the chelated mineral salt potassium citrate packaged in small sachets which are intended to be added directly to hot coffee and/or hot tea beverages having at least a temperature of 168° F.

6 Claims, No Drawings

FUNCTIONAL ADDITIVE FOR HOT BEVERAGES AND FOODS

FIELD OF THE INVENTION

The present disclosure relates generally to functional compositions for producing molecular hydrogen in hot foods and beverages for use in retail, nutraceutical, agricultural, health care, cosmetic, and scientific research applications.

BACKGROUND

Molecular Hydrogen has been widely studied around the globe as novel therapeutic gas. Evidence suggest that it may be a potent antioxidant and powerful anti-inflammatory agent. Hydrogen gas can be dissolved at a maximum concentration of 1.6 ppm under standard atmospheric temperature and pressure conditions as per Henrys law. One method for obtaining hydrogen rich water is from a machine called a water ionizer which often produce alkaline water with some molecular hydrogen dissolved in the water. These water ionizers are quite costly to purchase and are large, bulky machines which require an electrical outlet and a water line to produce hydrogen water.

Zinc has been mined and utilized by mankind for thousands of years. Zinc has been used for industrial, ornamental, or utilitarian purposes for nearly 2,000 years. Zinc is an essential trace element required by humans, animals, plants, and microorganisms, playing a critical role in numerous biological processes, including both prenatal and postnatal development. It is the second most abundant transition metal in the human body after iron and serves as a vital structural, catalytic, and regulatory cofactor for over 300 enzymes and 1,000 transcription factors. Uniquely, zinc is the only metal found to be involved in all six enzyme classes-oxidoreductases, transferases, hydrolases, lyases, isomerases, and ligases. Zinc plays a crucial role in the body's antioxidant defense system by acting as a cofactor for enzymes like superoxide dismutase (SOD). Zinc also helps stabilize cell membranes, protects protein sulfhydryl groups, and induces the production of metallothioneins, all of which contribute to its antioxidant properties.

Over the last fifteen or so years effervescent tablets containing finely ground metal magnesium powder have become commercially available which are being sold as hydrogen supplements. It is worth noting however that the mineral magnesium is widely available as a supplement and is commonly found in many foods and nutritional formulations.

Accordingly, there is a need for new compositions for producing hydrogen-rich water which are not magnesium-based or costly machine ionizers.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In one embodiment of the present disclosure a composition for use as a functional additive in hot foods and beverages is disclosed. The composition comprises a quantity between 5 mg to 35 mg of finely ground, unstabilized elemental zinc, wherein the zinc is zero-valent, non-ionic, and non-oxidized; has particle size ranging from 25 μm to 75

μm; and, has at least 98% purity; a chelated mineral salt selected from the group consisting of potassium gluconate, potassium citrate, potassium tartrate, potassium lactate, potassium aspartate, magnesium citrate, magnesium gluconate, magnesium lactate, magnesium aspartate, magnesium glycinate, magnesium malate, magnesium tartrate, zinc gluconate, zinc picolinate, zinc citrate, zinc bisglycinate, zinc aspartate, calcium gluconate, calcium citrate, calcium lactate, calcium aspartate, sodium citrate, sodium gluconate, sodium lactate, sodium tartrate, or any combination thereof; wherein, upon contact with an aqueous medium having a temperature of at least 168° F., the composition reacts to produce therapeutic hydrogen gas and zinc following the below reaction:

$$Zn + 2H_2O \rightarrow Zn(OH)_2 + H_2$$

In another embodiment of the present invention a composition for use as a functional additive in hot foods and beverages is disclosed. The composition comprises a quantity between 5 mg to 35 mg of finely ground, unstabilized elemental zinc, wherein the zinc is zero-valent, non-ionic, and non-oxidized; has particle size ranging from 25 μm to 75 μm; and, has at least 98% purity; wherein the unstabilized elemental zinc has a morphology selected from the group consisting of flaked, granular, crushed, amorphous, and spherical or any combination thereof; a chelated mineral salt selected from the group consisting of potassium gluconate, potassium citrate, potassium tartrate, potassium lactate, potassium aspartate, magnesium citrate, magnesium gluconate, magnesium lactate, magnesium aspartate, magnesium glycinate, magnesium malate, magnesium tartrate, zinc gluconate, zinc picolinate, zinc citrate, zinc bisglycinate, zinc aspartate, calcium gluconate, calcium citrate, calcium lactate, calcium aspartate, sodium citrate, sodium gluconate, sodium lactate, sodium tartrate, or any combination thereof; wherein the chelated mineral salt is in molar excess of the zinc powder; wherein, upon contact with an aqueous medium having a temperature of at least 168° F., the composition reacts to produce therapeutic hydrogen gas and zinc.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such a term to mean based on the contextual use of such term herein. To the extent that the meaning of a term used herein as understood by the ordinary artisan based on the contextual use of such term differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

As used herein, the term "aqueous medium," refers to any material (e.g. aqueous consumable material) that contains water in a sufficient quantity to allow the material to generate molecular hydrogen when the material is contacted with unstabilized elemental zinc and a chelated mineral salt. Aqueous mediums include, but are not limited to, liquids (e.g. beverages and foods), gels, sols and pastes.

As used herein, the term "passivation" refers to a natural process where a thin, protective layer forms on the surface of a metal, such as zinc.

As used herein, the term "molecular hydrogen" refers to hydrogen gas having chemical formula $H_2$, and may be referred to as hydrogen or hydrogen gas interchangeably.

As used herein, the term "therapeutic" refers to anti-inflammation potential, and/or anti-oxidant potential obtained by a living organism through the ingestion of a consumable material.

As used herein, the term "functional" refers to a composition that imparts a physiological, biological, or nutritional effect when ingested by a subject. Such effects may include, but are not limited to, support of normal bodily functions, enhancement of well-being, provision of essential nutrients, or mitigation of undesired physiological conditions. The term is intended to encompass compositions that are not necessarily pharmaceutical in nature, but which provide a benefit beyond basic caloric or flavor contribution.

As used herein, "unstabilized elemental zinc" refers to zinc in its zero-valent, non-ionic, non-oxidized atomic form ($Zn^0$) of the element zinc, and should not be interpreted to mean or imply zinc salts, zinc-containing compounds, coordination complexes, organozinc species, or any ionic forms of zinc.

In certain embodiments a composition for use as functional additive for hot foods and beverages having at least a temperature of 168° F. is disclosed. The functional composition is comprised of a quantity of unstabilized elemental zinc. The quantity may be between 10 mg to 35 mg of unstabilized elemental zinc, for example 10 mg, 15 mg, 20 mg, 25 mg, 30 mg, or 35 mg of unstabilized elemental zinc and a quantity of the chelated mineral salt so that the ratio of elemental unstabilized zinc to chelated mineral salt is such that the chelated mineral salt is in molar excess of the elemental unstabilized zinc. Wherein the chelated mineral salt is selected from the group consisting of potassium gluconate, potassium citrate, potassium tartrate, potassium lactate, potassium aspartate, magnesium citrate, magnesium gluconate, magnesium lactate, magnesium aspartate, magnesium glycinate, magnesium malate, magnesium tartrate, zinc gluconate, zinc picolinate, zinc citrate, zinc bisglycinate, zinc aspartate, calcium gluconate, calcium citrate, calcium lactate, calcium aspartate, sodium citrate, sodium gluconate, sodium lactate, sodium tartrate, or any combination thereof. Quantities of the chelated mineral salt may range anywhere from 50 mg to 150 mg, for example 50 mg, 60 mg, 70 mg, 80 mg, 90 mg, 100 mg, 110 mg, 120 mg, 130 mg, 140 mg or 150 mg of the chelated mineral salt. Wherein, upon contact with an aqueous medium having a temperature of at least 168° F., the composition reacts to produce therapeutic hydrogen gas and zinc.

In some embodiments a composition for use a functional additive for hot foods and beverages is described comprising between 5 mg to 35 mg of finely ground, unstabilized elemental zinc, wherein the zinc is zero-valent, non-ionic, and non-oxidized, has particle size ranging from 25 μm to 75 μm, and has at least 98% purity; and a chelated mineral salt selected from the group consisting of potassium gluconate, potassium citrate, potassium tartrate, potassium lactate, potassium aspartate, magnesium citrate, magnesium gluconate, magnesium lactate, magnesium aspartate, magnesium glycinate, magnesium malate, magnesium tartrate, zinc gluconate, zinc picolinate, zinc citrate, zinc bisglycinate, zinc aspartate, calcium gluconate, calcium citrate, calcium lactate, calcium aspartate, sodium citrate, sodium gluconate, sodium lactate, sodium tartrate, or any combination thereof; and 5 mg to 10 mg of copper glycinate. Wherein, upon contact with an aqueous medium having a temperature of at least 168° F., the composition reacts to produce therapeutic hydrogen gas and zinc.

A minimum aqueous medium temperature of 168° F. and optimal aqueous medium temperature range 171° F.-196° F. are preferred for production of the hydrogen. Aqueous mediums having a temperature of below 168° F. but above 90° F. could be used however the reaction time slows down significantly. Aqueous mediums having temperature above 196° F. will tend to expel the produced hydrogen gas out of the medium rapidly. The heat of the aqueous medium indirectly provides activation energy for zinc to react with the water present in the aqueous medium to form zinc hydroxide and hydrogen gas as per the below equation:

$$Zn + 2H_2O \rightarrow Zn(OH)_2 + H_2$$

Heat, in this case heat from the aqueous medium, increases the kinetic energy of the molecules. As a result, more particles have enough energy to overcome the activation energy barrier, thus the reaction rate increases as a larger fraction of particles in the system now have energies greater than or equal to the necessary activation energy which leads to more frequent and effective collisions, and hence a faster reaction rate as described by the Arrhenius equation which relates reaction rate to activation energy shown below:

$$k = Ae^{-Ea/RT}$$

Additionally, in the presence of a chelated mineral salt, finely ground unstabilized elemental zinc particles react with an aqueous medium having a temperature of at least 168° F. to yield zinc hydroxide and hydrogen. Chelated mineral salts indirectly tend to lower the effective activation energy by preventing passivation of the zinc surface.

In some embodiments the chelated mineral salt is in molar excess of the unstabilized elemental zinc. The molar excess of the chelated mineral salt is to ensure sufficient quantities of the chelated mineral salt are available to disrupt or to prevent the formation of the passivating $Zn(OH)_2$ layer by keeping $Zn^{2+}$ ions soluble and complexed by binding $Zn^{2+}$ ions released at the surface, removing them from the equilibrium and preventing the buildup of $Zn(OH)_2$— thus an excess is needed to ensure sufficient chelated mineral salts are present to prevent passivation of the zinc thus ensuring the surface of the zinc remains free from a zinc oxide layer.

Zinc is a transition metal having electron configuration of $1s^2\,2s^2\,2p^6\,3s^2\,3p^6\,4s^2\,3d^{10}$. Elemental Zinc or Metallic Zinc is commercially and readily available as a stabilized powder and as an unstabilized powder. Unstabilized elemental zinc powder is less commonly found on the market than the stabilized version and is for specialized applications as it contains a small percentage of zinc oxide which renders the zinc as stable for transport and handling. It should be noted however that on the market both stabilized and unstabilized version of elemental zinc are labeled and called zinc, zinc powder, zinc dust or zinc metal powder without the proper distinguishment in the title of whether or not the zinc is stabilized or unstabilized elemental zinc powder. It should further be noted that any art which teaches the use elemental zinc without the additional limitation of specifying weather it is unstabilized elemental zinc does not accurately distinguish between stabilized elemental zinc from unstabilized elemental zinc, since the unstabilized elemental zinc will react with hot water to produce hydrogen, however the stabilized elemental zinc will not react with water to produce hydrogen due to the presence of the zinc oxide. Unstabilized elemental zinc is specifically called for use in the present invention, as stabilized elemental zinc is not sufficiently reactive to form hydrogen gas when in contact with an aqueous medium.

Stabilized elemental zinc powder is produced by taking high-purity unstabilized elemental zinc powder and exposing it to controlled amounts of oxygen or air under carefully monitored conditions such as for ensuring the correct temperature and humidity. This process causes a thin, uniform layer of zinc oxide (ZnO) to form on the surface of each zinc particle. The ZnO layer acts as a passivation film, protecting the underlying unstabilized elemental zinc from rapid further oxidation and preventing it from reacting. This oxide coating typically makes up about 3 to 6 percent of the overall mass, resulting in the stabilized elemental zinc powder's characteristic composition of roughly 95% zinc and 5% zinc oxide. Stabilizing zinc powder in this way improves its shelf stability, controls its reactivity to prevent violent reactions or passivation during use, and enhances handling safety by reducing risks such as dust explosions or spontaneous ignition. Unstabilized elemental zinc, sometimes referred to as pyrophoric zinc, has not gone through this process of stabilization and remains reactive, able to produce hydrogen in solution in the presence of chelated mineral salts and a minimum solution temperature of 168° F.

The morphology or the physical form, e.g., size and shape, of the unstabilized elemental zinc particles may be used to affect the reaction rate. Particles may be spherical, spheroidal, granular, or flaked. Smaller particles and particles with higher surface area to volume ratios react with faster kinetics. Mixtures of various sizes may also be employed. Flaked unstabilized elemental zinc particles have a higher surface area to volume ratio than granular elemental zinc particles.

In one embodiment a composition for producing hydrogen in the form of a mini-caplet is disclosed. The composition comprises between 5 mg to 35 mg of finely ground, unstabilized elemental zinc, wherein the zinc is zero-valent, non-ionic, and non-oxidized, has particle size ranging from 25 μm to 75 μm, and has at least 98% purity. The composition further comprises a chelated mineral salt selected from the group consisting of potassium gluconate, potassium citrate, potassium tartrate, potassium lactate, potassium aspartate, magnesium citrate, magnesium gluconate, magnesium lactate, magnesium aspartate, magnesium glycinate, magnesium malate, magnesium tartrate, zinc gluconate, zinc picolinate, zinc citrate, zinc bisglycinate, zinc aspartate, calcium gluconate, calcium citrate, calcium lactate, calcium aspartate, sodium citrate, sodium gluconate, sodium lactate, sodium tartrate, or any combination thereof. The composition further comprises a tableting filler, a tableting binder and a tableting lubricant. The composition may optionally contain between 5 mg to 10 mg of copper glycinate.

The chelating ligands include gluconate, which is derived from gluconic acid; citrate, from citric acid; tartrate, from tartaric acid; lactate, from lactic acid; and aspartate, which comes from the amino acid aspartic acid. Other ligands are glycinate, originating from the amino acid glycine; malate, from malic acid; picolinate, derived from picolinic acid; and bisglycinate, which involves two glycine molecules forming a chelate complex.

The chelating ligands include gluconate, derived from gluconic acid, which forms stable complexes with zinc ions, preventing formation of insoluble zinc oxides that cause passivation. Citrate, from citric acid, strongly binds zinc ions and maintains them in solution, inhibiting oxide layer buildup on the metal surface. Tartrate, from tartaric acid, acts similarly by complexing zinc ions and disrupting oxide film formation. Lactate, originating from lactic acid, chelates zinc and stabilizes soluble zinc species, reducing surface corrosion and passivation. Aspartate, from the amino acid aspartic acid, forms soluble zinc complexes that keep the metal surface reactive by preventing hard oxide coatings. Glycinate, derived from glycine, coordinates with zinc ions and helps maintain a protective but non-passivating layer. Malate, from malic acid, binds zinc ions and hinders the formation of insulating oxide films. Picolinate, from picolinic acid, forms strong chelates that increase zinc solubility and reduce oxide deposits. Lastly, bisglycinate, involving two glycine molecules, forms very stable zinc complexes that effectively prevent passivation by keeping the zinc surface clean and reactive.

Producing solid oral dosage forms such as mini-caplet tablets by direct compression involves blending the composition of unstabilized elemental zinc and a chelated mineral salt with suitable excipients such as fillers, binders, and lubricants to create a uniform powder blend that can be compressed into tablets. Direct compression is a preferred method due to its simplicity, cost-effectiveness, and reduced processing time, as it eliminates the need for granulation steps. While moisture control is still important to maintain powder flowability and prevent passivation of the unstabilized elemental zinc particle surface. Production areas typically would need to maintain moderate relative humidity levels—often between 20% and 30%—to reduce the passivation occurring on the surface of the unstabilized elemental zinc and minimize issues like sticking or picking during compression. Proper ventilation and environmental controls help maintain consistent tablet quality and manufacturing efficiency. Direct compression is favored in this process due to its simplicity, reduced processing steps, and ability to maintain the integrity of moisture-sensitive ingredients.

Sachets that are moisture- or humidity-proof are typically made from barrier materials designed to prevent the passage of water vapor. The most effective sachets use aluminum foil laminated with plastic films such as polyester or polypropylene, where the aluminum layer provides excellent protection against moisture, oxygen, and light. Metalized film sachets, which consist of plastic films coated with a thin layer of metal (usually aluminum), also offer good moisture resistance, although generally not as strong as full aluminum foil. Multi-layer laminates, combining materials like PET, aluminum, and polyethylene or polypropylene, are engineered to maximize moisture barrier properties as well as mechanical strength and sealability. Some sachets made from high-density polyethylene or polypropylene with specialized coatings can provide moderate moisture protection, but these are typically less effective than those containing aluminum layers. Overall, aluminum foil laminates or multi-layer laminates with aluminum are preferred for the best protection against moisture and humidity, especially for sensitive products like pharmaceuticals, powders, and effervescent formulations.

In other embodiments a composition for producing hydrogen in the form of a mini-caplet is disclosed. The composition comprises between 5 mg to 35 mg of finely ground, unstabilized elemental zinc, wherein the zinc is zero-valent, non-ionic, and non-oxidized, has particle size ranging from 25 μm to 75 μm, and has at least 98% purity. The composition further comprises a chelated mineral salt selected from the group consisting of potassium gluconate, potassium citrate, potassium tartrate, potassium lactate, potassium aspartate, magnesium citrate, magnesium gluconate, magnesium lactate, magnesium aspartate, magnesium glycinate, magnesium malate, magnesium tartrate, zinc gluconate, zinc picolinate, zinc citrate, zinc bisglycinate, zinc aspartate, calcium gluconate, calcium citrate, calcium lactate, calcium aspartate, sodium citrate, sodium gluconate, sodium lactate, sodium tartrate, or any combination thereof. The composition further comprises a tableting filler, a tableting binder and a tableting lubricant. The composition may optionally contain between 5 mg to 10 mg of copper glycinate. The composition of unstabilized elemental zinc and a chelated mineral salt is blended with suitable excipients such as fillers, binders, and lubricants to create a uniform powder blend that can be compressed into tablets. Direct compression is a preferred method due to its simplicity, cost-effectiveness, and reduced processing time, as it eliminates the need for granulation steps.

In yet another embodiment a composition for use a functional additive for hot foods and beverages is described comprising between 5 mg to 35 mg of finely ground, unstabilized elemental zinc, wherein the zinc is zero-valent, non-ionic, and non-oxidized, has particle size ranging from 25 μm to 75 μm, and has at least 98% purity; and a chelated mineral salt selected from the group consisting of potassium gluconate, potassium citrate, potassium tartrate, potassium lactate, potassium aspartate, magnesium citrate, magnesium gluconate, magnesium lactate, magnesium aspartate, magnesium glycinate, magnesium malate, magnesium tartrate, zinc gluconate, zinc picolinate, zinc citrate, zinc bisglycinate, zinc aspartate, calcium gluconate, calcium citrate, calcium lactate, calcium aspartate, sodium citrate, sodium gluconate, sodium lactate, sodium tartrate, or any combination thereof; the composition may optionally contain between 5 mg to 10 mg of copper glycinate. Wherein, upon contact with an aqueous medium having a temperature of at least 168° F., the composition reacts to produce therapeutic hydrogen gas and zinc. The amount of hydrogen produced is between 0.200 ppm to 0.600 ppm, e.g. 0.200 ppm, 0.300 ppm, 0.400 ppm, 0.500 ppm or 0.600 ppm of hydrogen produced in solution. Wherein the composition is packaged in a sachet which is moisture or humidity proof.

In certain embodiments, the composition may be formulated as a mini-caplet. The mini-caplet may be substantially oblong or oval in shape, with smoothly contoured edges to facilitate swallowing. The preferred dimensions of the mini-caplet may range from approximately 4 mm to 8 mm in length and 2 mm to 4 mm in width, although other sizes may be used depending on the target population or dosage requirements. The compact size and rounded shape of the mini-caplet enhance ease of oral administration, particularly for individuals who experience difficulty swallowing standard-sized tablets. The mini-caplet may pass more easily through the esophagus and may reduce the risk of discomfort or gag reflex commonly associated with larger oral dosage forms.

Suitable tableting lubricants include, but are not limited to, magnesium stearate, stearic acid, and calcium stearate. Suitable tableting binders include, but are not limited to, microcrystalline cellulose (MCC), hydroxypropyl methylcellulose (HPMC), methylcellulose, hydroxypropyl cellulose (HPC), carboxymethylcellulose (CMC), acacia gum, and xanthan gum. Suitable tableting filler include, but are not limited to, anhydrous or dihydrate dicalcium phosphate.

A prepared mixture comprising 20 mg of unstabilized elemental zinc and 150 mg of Potassium Citrate was added to 200 mL of water at 190° F. The resulting amount of hydrogen produced, measured in milliliters (mL), at various time intervals is shown below in Table 1.

TABLE 1

| Time (in minutes) | Amount of hydrogen (ppm) | Water Temperature |
|---|---|---|
| 3:00 | 0.406 | 174° F. |
| 5:00 | 0.339 | 158° F. |
| 10:00 | 0.287 | 133° F. |

As demonstrated in Table 1, the concentration of hydrogen decreases with time under the specified conditions as the hydrogen dissipates into the ambient atmosphere.

A prepared mixture comprising 35 mg of unstabilized elemental zinc and 180 mg of Potassium Citrate was added to 200 mL of water at 190° F. The resulting amount of hydrogen produced, measured in milliliters (mL), at various time intervals is shown below in Table 2.

TABLE 2

| Time (in minutes) | Amount of hydrogen (ppm) | Water Temperature |
|---|---|---|
| 3:00 | 0.572 | 175° F. |
| 5:00 | 0.447 | 155° F. |
| 10:00 | 0.338 | 131° F. |

As demonstrated in Table 1, the concentration of hydrogen decreases with time under the specified conditions as the hydrogen dissipates into the ambient atmosphere.

EXAMPLES

Example 1

A sachet configured for use as a functional additive for hot foods and beverages includes the following components:

20 mg unstabilized elemental zinc 120 mg potassium citrate 2 mg silicon dioxide

These ingredients may be packaged into a suitable sachet of 2.0 inches length and height of 1.0 inch.

Example 2

A sachet configured for use as a functional additive for hot foods and beverages includes the following components:

30 mg unstabilized elemental zinc 150 mg magnesium citrate 2 mg silicon dioxide

These ingredients may be packaged into a suitable sachet of 2.0 inches length and height of 1.0 inch.

Example 3

A tablet in the form of a mini-caplet configured for use in hot foods and beverages includes the following components:

20 mg unstabilized elemental zinc 100 mg potassium citrate

Sufficient amounts of filler, binding agent and lubricant to bring the total tablet mass to 300 mg.

These ingredients may be pressed into a mini-caplet shape using a direct compression method on a tablet press.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A composition for use as a functional additive in hot foods and beverages, said composition comprising:

5 to 35 mg of unstabilized elemental zinc, wherein the unstabilized elemental zinc is zero-valent, non-ionic, and non-oxidized, has a particle size ranging from 25 μm to 75 μm, and has a purity of at least 98%; and a chelated mineral salt wherein, upon contact with an aqueous medium having a temperature of at least 168° F., the composition reacts with water to produce hydrogen gas.

2. The composition of claim 1, wherein the unstabilized elemental zinc has a morphology selected from a group consisting of: flaked, granular, crushed, amorphous, spherical, and any combination thereof.

3. The composition of claim 1 wherein the chelated mineral salt is selected from the group consisting of: potassium gluconate, potassium citrate, potassium tartrate, potassium lactate, potassium aspartate, magnesium citrate, magnesium gluconate, magnesium lactate, magnesium aspartate, magnesium glycinate, magnesium malate, magnesium tartrate, zinc gluconate, zinc picolinate, zinc citrate, zinc bisglycinate, zinc aspartate, calcium gluconate, calcium citrate, calcium lactate, calcium aspartate, sodium citrate, sodium gluconate, sodium lactate, sodium tartrate, and any combination thereof.

4. The composition of claim 1 wherein the chelated mineral salt is in molar excess of the unstabilized elemental zinc.

5. The composition of claim 1 further comprising between 5 mg to 10 mg of copper glycinate.

6. The composition of claim 5, wherein the composition is in the form of a mini-caplet and further comprises a filler, tableting lubricant and a binder.

\* \* \* \* \*